(12) United States Patent
Kläui

(10) Patent No.: US 6,217,298 B1
(45) Date of Patent: Apr. 17, 2001

(54) ELECTRODYNAMIC TRANSMISSION AND A CENTRIFUGAL PUMP WITH A TRANSMISSION OF THIS KIND

(75) Inventor: Erich Kläui, Seuzach (CH)

(73) Assignee: Sulzer Innotec AG, Winterthur (CH)

( * ) Notice: Subject to any disclaimer, the term of this patent is extended or adjusted under 35 U.S.C. 154(b) by 0 days.

(21) Appl. No.: 09/298,066

(22) Filed: Apr. 22, 1999

(30) Foreign Application Priority Data

Apr. 30, 1998 (EP) .................................................. 98810391

(51) Int. Cl.[7] ............................. F04B 17/00; H02K 1/22; H02K 49/02
(52) U.S. Cl. ..................... 417/420; 310/266; 310/106; 310/103; 310/105
(58) Field of Search ................................. 417/423.7, 420; 310/266, 106, 103, 105

(56) References Cited

U.S. PATENT DOCUMENTS

| 1,476,458 | | 12/1923 | Murray . | |
|---|---|---|---|---|
| 2,594,931 | * | 4/1952 | Jaeschke | 172/284 |
| 3,645,650 | * | 2/1972 | Laing | 417/420 |
| 4,065,234 | * | 12/1977 | Yoshiyuki et al. | 417/420 |
| 5,501,582 | * | 3/1996 | Gautier et al. | 417/420 |
| 5,554,903 | * | 9/1996 | Takara | 310/266 |
| 5,606,210 | * | 2/1997 | Lin | 310/153 |

FOREIGN PATENT DOCUMENTS

| 840411 | 6/1952 | (DE) . |
|---|---|---|
| 973739 | 5/1960 | (DE) . |
| 2819793 | 11/1978 | (DE) . |
| 19631824A1 | 2/1998 | (DE) . |
| 403689 | 10/1945 | (FR) . |

\* cited by examiner

Primary Examiner—Charles G. Freay
Assistant Examiner—Timothy P. Solak
(74) Attorney, Agent, or Firm—Townsend and Townsend and Crew LLP

(57) ABSTRACT

The transmission comprises at least three induction systems which are arranged axially one after the other or coaxially one above the other and which can be rotated about a common axis of rotation (4). The induction system in the middle is in each case provided in the side faces with a winding which are connected to one another and are executed in such a manner that the magnetic rotary fields which arise by means of relative movement between the induction system in the middle and one adjacent induction system effect a relative movement between the induction system in the middle and the other adjacent induction system in order to produce an output movement.

18 Claims, 4 Drawing Sheets

ELECTRODYNAMIC TRANSMISSION AND A CENTRIFUGAL PUMP WITH A TRANSMISSION OF THIS KIND

BACKGROUND OF THE INVENTION

The invention relates to an electrodynamic transmission and to a centrifugal pump with a transmission of this kind.

The object of the invention is to provide an electrodynamic transmission which is simply constructed.

SUMMARY OF THE INVENTION

The advantages which can be achieved with the invention are substantially to be seen wherein no external electrical auxiliary or control energy is required and wherein the transmission can be driven in different ways.

DETAILED DESCRIPTION OF THE PREFERRED EXEMPLARY EMBODIMENTS

Figure 1:
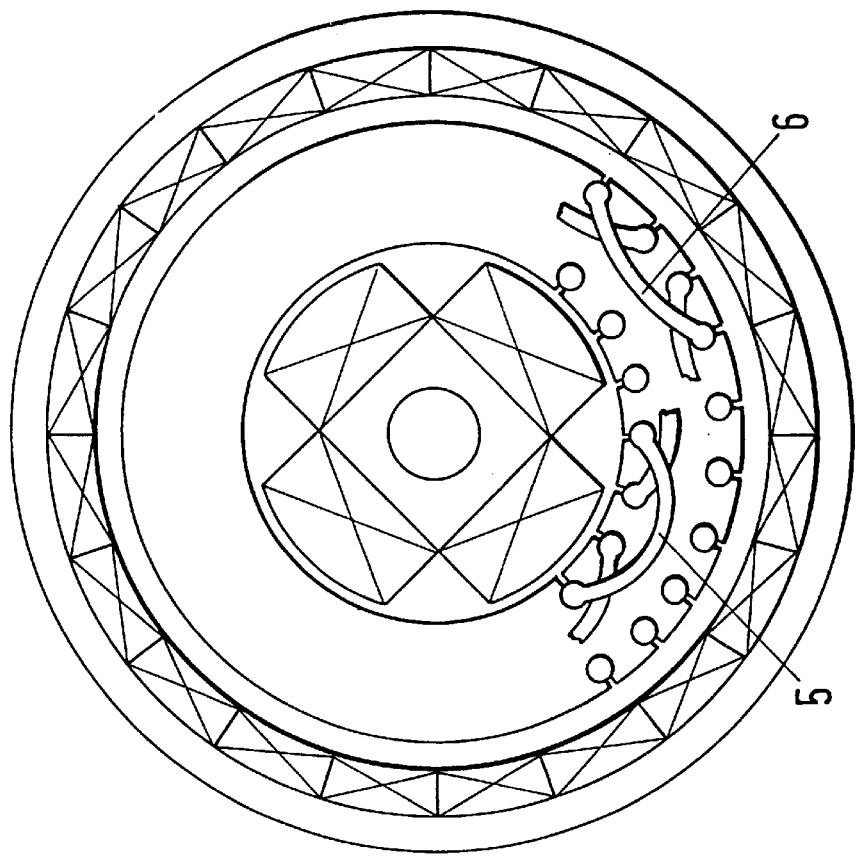
FIG. 1 is a view of an embodiment of a transmission in accordance with the invention.
Figure 2:
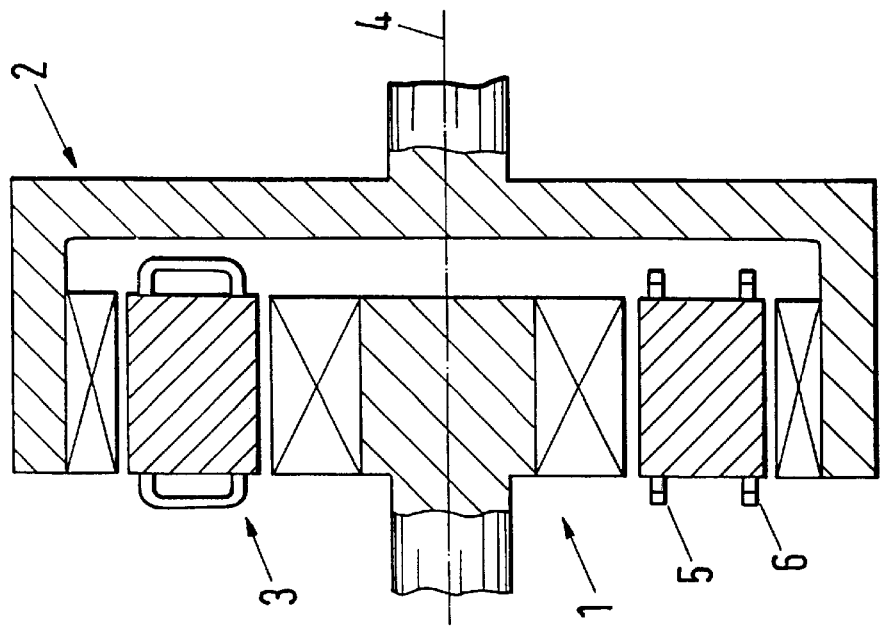
FIG. 2 is a section along the line II—II in FIG. 1.

As FIGS. 1 and 2 show, the electromagnetic transmission contains an inner pole wheel 1, an outer pole wheel 2 and an intermediate armature 3 which have a common axis of rotation 4. The inner pole wheel 1 is designed in the manner of a permanent magnetic pole wheel for synchronous machines and has p1 pole pairs. The outer pole wheel 2 is designed in the manner of a permanent magnetic outer rotor for a synchronous machine and has p2 pole pairs. The outer pole wheel 2 surrounds the intermediate armature 3. The intermediate armature 3 is designed in ring shape and surrounds the inner pole wheel 1. The intermediate armature 3 consists of a ferromagnetic material. First and second multiple phase windings 5, 6 are arranged at the inner and outer periphery of the intermediate armature 3. The first winding 5 has a pole number p1 and the second winding 6 has a pole number p2. The windings 5, 6 are designed in such a manner that a magnetic rotary field which acts on the one winding produces a magnetic rotary field in the other winding.

It is pointed out that instead of the permanent magnetic pole wheels, armatures with a multiple phase alternating current winding, e.g. a short circuited cage rotor winding, can also be used. It is likewise possible to arrange this alternating current winding in a ring winding or a disc winding.

Figure 3:
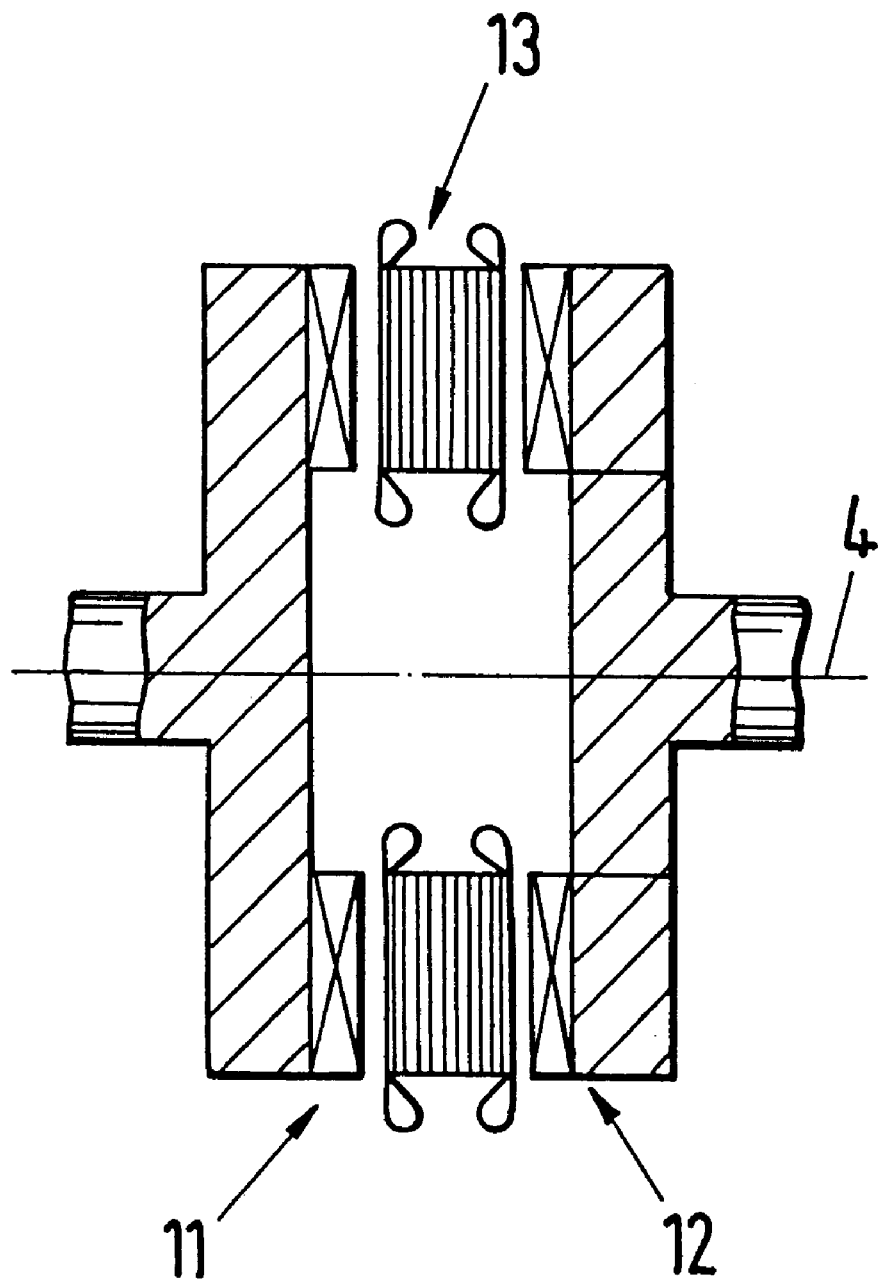
FIG. 3 is a cross-section of another embodiment of the transmission in accordance with the invention.

FIG. 3 shows an embodiment which contains disc-shaped pole wheels 11, 12 and a ring-shaped intermediate armature 13 which have a common axis of rotation.

It is assumed that the pole wheels 1, 2; 11, 12 are rotatably arranged and that the intermediate armature 3; 13 is stationarily arranged. Through the driving of the inner pole wheel 1, a relative movement results between the pole wheel and the intermediate armature. Electric currents are thereby induced in the first winding 5 of the intermediate armature 3. These produce a rotary field in the second winding 6. This rotary field in turn causes a relative movement between the intermediate armature 3; 13 and the outer pole wheel 2; 12 so that the outer pole wheel rotates.

Through the choice of the pole pairs p1 and p2 and the design of the winding, heads between the first and the second winding the ratio of the relative speeds and the direction of rotation and hence the transmission ratio of the transmission can be determined. The transmission can be operated in different ways depending on which of the transmission members 1, 2, 3; 11, 12, 13 is stationarily arranged and which is mechanically driven. If the intermediate armature 3, 13 is driven, then a transmission results with two secondary drive speeds of rotation.

Figure 4:
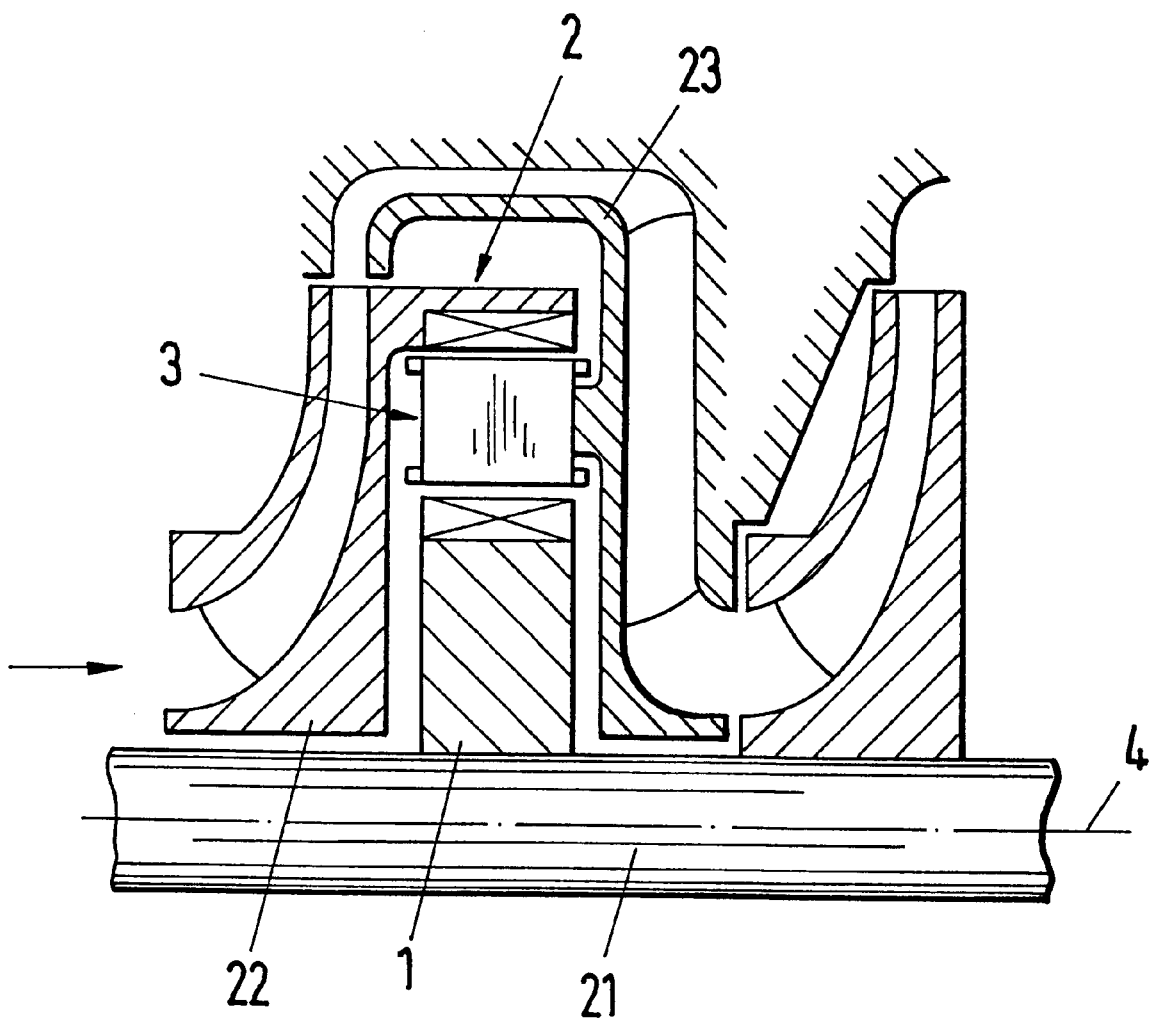
FIG. 4 is a partial section of an embodiment of a centrifugal pump in accordance with the invention and FIG. 5 is a partial section of another embodiment of a centrifugal pump in accordance with the invention.
Figure 5:
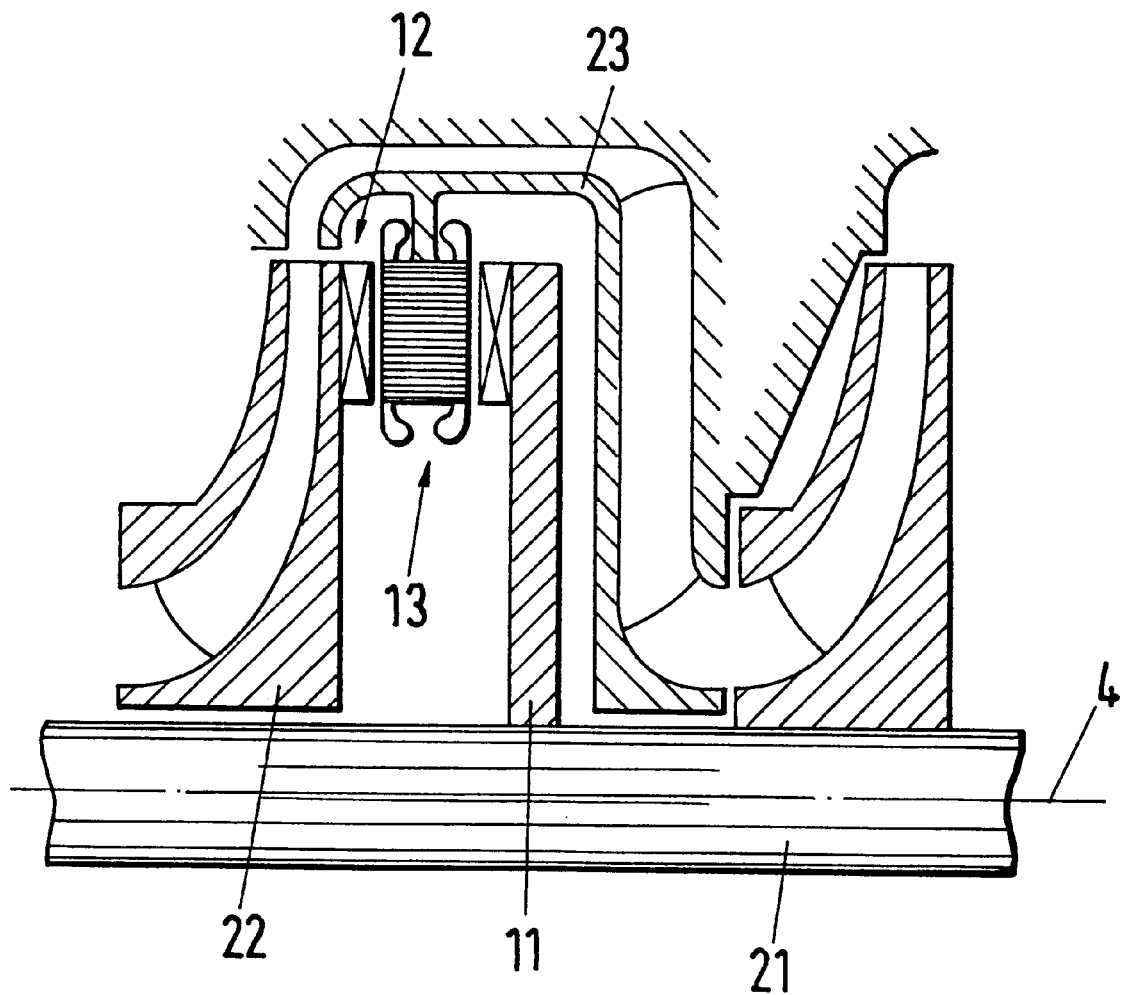

The use of the above-described electromagnetic transmission in a centrifugal pump can be seen in FIGS. 4 and 5. Multiple stage centrifugal pumps require a relatively high run-in pressure at the entry of the first stage in order to prevent cavitations in the latter. For this, feeder pumps or special suction wheels in different embodiments can be used which are driven by means of mechanical converters, e.g. a planetary transmission.

As FIG. 4 shows, the inner pole wheel 1 is mounted on the pump shaft 21. The outer pole wheel 2 is arranged in the rotor 22 and the intermediate armature 3 is mounted in the pump housing 23.

In the embodiment in accordance with FIG. 5 the inner pole wheel 11 is mounted on the pump shaft 21 and the outer pole wheel 12 is arranged at the rotor 22. The intermediate armature 13 is mounted at the pump housing 23.

The transmission comprises at least three induction systems 1, 2, 3 which are arranged axially one after the other or coaxially one above the other and which can be rotated about a common axis of rotation 4. The induction system 3; 13 in the middle is in each case provided in the side faces with a winding 5, 6 which are connected to one another and are executed in such a manner that the magnetic rotary fields which arise by means of relative movement between the induction system 3; 13 in the middle and one adjacent induction system 1, 11; 2, 12 effect a relative movement between the induction system in the middle and the other adjacent induction system in order to produce an output movement.

What is claimed is:

1. A dynamo-electric transmission wherein at least a first, a second and a third induction system are arranged coaxially one above the other and can be rotated about a common axis of rotation; and wherein the second induction system is arranged in the middle between the first and third induction system, wherein a first and second winding (5, 6) is arranged in the second induction system, wherein the first winding is directed to the first induction system and the second winding is directed to the third induction system, wherein the first and second windings are electrically connected to one another, and that the first, second and third induction systems are rotably arranged with respect to one another and are built such that one of either: the first induction system induces an electric current in the first winding, wherein the electric current flows through the second winding and the second winding provides the electric current onto the third induction system such that an activating force is induced onto the third induction system; or the third induction system induces an electric current in the second winding, wherein the electric current flows through the first winding and the first winding provides the electric current onto the first induction system such that an activating force is induced onto the first induction system.

2. A transmission in accordance with claim 1, wherein the induction systems are executed in ring shape or in disc shape.

3. A transmission in accordance with claim 1, wherein the induction systems adjacent to the induction system in the middle contain a winding and/or permanent magnets.

4. A transmission in accordance with claim 3, comprising a winding selected from the group of: direct current winding, single or multiple phase alternating current winding, cage winding.

5. A transmission in accordance with claim 3, wherein the permanent magnets are arranged in the means which conduct the magnetic flux; and wherein the induction systems which are adjacent to the middle one are designed as pole wheels.

6. A transmission in accordance with claim 1, wherein the windings of the induction systems are single or multiple phase alternating current windings, of which the phase numbers are compatible and of which the pole numbers are the same or different.

7. A transmission in accordance with claim 1, wherein the windings of the induction system in the middle are connected in such a manner that magnetic rotary fields generated by the windings are one of the same or run contrary.

8. A transmission in accordance with claim 1, wherein the other induction systems which are adjacent to the windings of the induction system in the middle have the same number of poles in each case.

9. A transmission in accordance with claim 1, wherein the windings can also be designed as a ring winding.

10. A transmission in accordance with claim 1, wherein the first and second windings consist of only one conductor per coil side.

11. A transmission in accordance with claim 1, wherein the conductor consists of interlaced partial conductors.

12. A transmission in accordance with claim 1, wherein the induction system in the middle has a core which is selected form the group consisting of laminated sheet metal, wound profile wire, powder compound material, ferrite, which consist of ferromagnetic material.

13. A transmission in accordance with claim 1, wherein the induction systems can be chosen as an input element or as an output element.

14. A transmission in accordance with claim 1, wherein one induction system is stationarily arranged: and wherein the other induction systems can be chosen as an input element or as an output element.

15. A centrifugal pump comprising a transmission in accordance with claim 1 wherein the induction systems are arranged coaxially; wherein the induction system in the middle is stationarily arranged; and wherein the inner or the outer induction system is provided as an input element.

16. A centrifugal pump comprising a transmission in accordance with claim 1 wherein the induction systems are arranged coaxially; wherein the outer or the inner induction system is stationarily arranged; and wherein the induction system in the middle or the adjacent movable induction system is provided as an input element.

17. A centrifugal pump comprising a transmission in accordance with claim 1 wherein the induction systems are arranged axially one behind the other; wherein the induction system in the middle is stationarily arranged; and wherein one of the outer induction systems is provided as an input element.

18. A centrifugal pump comprising a transmission in accordance with claim 1 wherein the induction systems are arranged axially one behind the other; wherein one of the outer induction systems is stationarily arranged; and wherein either the induction system in the middle or the adjacent movable induction system is provided as an input element.

* * * * *